(12) United States Patent
Peterman (10) Patent No.: US 10,391,815 B2
(45) Date of Patent: Aug. 27, 2019

(54) MULTIPLE LAYER FOAM INSERT FOR TIRES

(71) Applicant: Mark H. Peterman, Saratoga Springs, NY (US)

(72) Inventor: Mark H. Peterman, Saratoga Springs, NY (US)

(*) Notice: Subject to any disclaimer, the term of this patent is extended or adjusted under 35 U.S.C. 154(b) by 162 days.

(21) Appl. No.: 15/292,664

(22) Filed: Oct. 13, 2016

(65) Prior Publication Data

US 2017/0297375 A1    Oct. 19, 2017

Related U.S. Application Data (60) Provisional application No. 62/391,063, filed on Apr. 19, 2016.

(51) Int. Cl.
| | |
|---|---|
| *B60C 7/00* | (2006.01) |
| *B60C 19/12* | (2006.01) |
| *B60C 7/10* | (2006.01) |
| *B29D 30/00* | (2006.01) |
| *B29C 48/06* | (2019.01) |
| *B29C 48/00* | (2019.01) |
| *B29L 30/00* | (2006.01) |

(52) U.S. Cl.
CPC .......... *B60C 7/105* (2013.01); *B29C 48/0021* (2019.02); *B29C 48/0022* (2019.02); *B29C 48/022* (2019.02); *B29C 48/06* (2019.02); *B29D 30/0061* (2013.01); *B60C 19/12* (2013.01); *B29L 2030/008* (2013.01); *B60C 2200/10* (2013.01); *B60C 2200/12* (2013.01)

(58) Field of Classification Search
CPC ..... B60C 2001/0091; B60C 7/00; B60C 7/10; B60C 7/105; B60C 7/22; B60C 19/12; B60C 19/122
See application file for complete search history.

(56) References Cited

U.S. PATENT DOCUMENTS

| | | | | |
|---|---|---|---|---|
| 640,644 | A | * | 1/1900 | Falconnet .............. B29C 35/16 152/323 |
| 3,762,935 | A | * | 10/1973 | Leach .................. C04B 28/342 106/122 |

(Continued)

FOREIGN PATENT DOCUMENTS

JP         53032503        *   3/1978

OTHER PUBLICATIONS https://www.freedictionary.com/envelop, no date.*

(Continued)

*Primary Examiner* — Justin R Fischer
(74) *Attorney, Agent, or Firm* — Barclay Damon LLP (57) ABSTRACT

A multiple layer foam insert replacement for a pneumatic inner tube for a tire. The multiple layer foam insert emulates the effect of air pressure, across a range of pressures, while still approaching the weight of the air filled tube. Through the use of different density materials and the orientation and thickness of such materials, the desirable characteristics of the pneumatic tube structure and performance can be emulated to a high degree. This multiple layer foam insert can be produced in varying levels of quality and function through the method of extrusion of foam materials in different sizes and layering.

11 Claims, 5 Drawing Sheets

(56) References Cited

U.S. PATENT DOCUMENTS

| | | | |
|---|---|---|---|
| 3,987,832 A * | 10/1976 | Funke | B60B 5/02 |
| | | | 152/310 |
| 4,003,419 A * | 1/1977 | Verdier | B60C 5/00 |
| | | | 152/312 |
| 4,371,023 A | 2/1983 | Campagna | |
| 4,392,522 A | 7/1983 | Bschorr | |
| 4,471,827 A | 9/1984 | Czapar | |
| 4,919,183 A | 4/1990 | Dobson | |
| 5,520,232 A | 5/1996 | Fkutake et al. | |
| 5,795,414 A | 8/1998 | Shih | |
| 6,054,078 A | 4/2000 | Lauer et al. | |
| 6,418,991 B1 | 7/2002 | Trice | |
| 6,588,469 B2 * | 7/2003 | Yukawa | B60C 19/00 |
| | | | 152/157 |
| 6,877,537 B1 | 4/2005 | Crow | |
| 7,025,069 B2 * | 4/2006 | Thiebaut | A45D 19/02 |
| | | | 132/270 |
| 7,358,282 B2 * | 4/2008 | Krueger | A61L 15/225 |
| | | | 521/139 |
| 7,788,971 B2 * | 9/2010 | Perrier | B60C 23/0493 |
| | | | 73/146 |
| 8,474,499 B2 | 7/2013 | Tuffile et al. | |
| 2010/0084064 A1 | 4/2010 | Kondo et al. | |

OTHER PUBLICATIONS https://www.merriam-webster.com/dictionary/encircle, no date.*
U. S. Patent and Trademark Office (ISA/US)—International Search Report and Written Opinion of ISA dated Jul. 6, 2017 from PCT/US17/21051 (total 10 pages).
International Bureau of WIPO—International Preliminary Report on Patentability dated Oct. 23, 2018 from PCT/US17/21051 (total 7 pages).

* cited by examiner

MULTIPLE LAYER FOAM INSERT FOR TIRES

REFERENCE TO RELATED APPLICATIONS

This application claims one or more inventions which were disclosed in Provisional Application No. 62/391,063, filed Apr. 19, 2016, entitled "Round tubular structure comprised of multi density extruded foam that when placed into the cavity of a pneumatic tire replaces the air filled tube formerly used to provide pressure and strength to the tire. This multi-density structure has the ability to emulate all characteristics of a pneumatic tube without the possibility of structural compromise due to air loss. The variation in design of the multiple layers of the construction of the foam components of the tubular structure allow for characteristics of pressure, performance and weight to be manipulated to achieve any desired performance". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of inner tubes for vehicle tires. More particularly, the invention pertains to a foam insert for use in tire and tube systems in bicycles, motorcycles, automobiles, trucks and other vehicles.

Description of Related Art

The susceptibility of the pneumatic tire to puncture is inherent in the nature of the elastomeric material that comprises the tire or the tire and the inner tube in the case of a bicycle or tube-type motor vehicle tire. When inflated, such elastomeric materials have the characteristics of providing both a cushioned ride and also giving greater traction than other materials, however this also has the unfortunate characteristic of having a decreased resistance to sharp objects.

Bicycle tires usually have a narrow outer rubber casing having a thin cross-section and an inner, air filled, butyl material inner tube, and they tend to be inflated to a much higher pressure than is common in motor vehicle tires. Unfortunately sharp objects can easily penetrate the outer rubber casing and puncture the inner tube. Flat tires are a common occurrence for all types of bicycles. Flat tires can be very frustrating for all classes of riders. Children's bikes with pneumatic tires can be especially bothersome. However for the adult performance rider having a flat tire especially in a remote location can be a dangerous experience leaving the rider stranded without any means of transportation. While many bike riders carry tire repair kits, tools and other devices such as air pumps and sealing materials for repairing flat tires, people often have difficulty in making such repairs especially when the need arises. In any event, penetration of the outer tire by thorns or other sharp objects resulting in the puncture of the inner tube and a flat is often a very unpleasant and frustrating experience especially if you are in a relatively remote area.

Various proposals have been made as to how this susceptibility to puncture may be avoided, with varying degrees of success. Methods which attempt to prevent puncture altogether include so-called tire liners which are attached to the inside of the tire casing or sandwiched by air pressure between the casing and an inner tube. In the past such liners have often been expensive and added significantly to the weight of the tire resulting in increased difficulty in propulsion for a cyclist.

Other solutions have sought to use solid rubber tubes in place of the air filled tube. While these do solve the problem of air loss, the high weight and lack of cushioning render the bicycle almost unrideable due to the sluggish nature and hard jarring ride that the bicycle with solid tubes imparts to the rider. Solid tubes are not accepted by any performance cyclist.

It is common to fill tires for off-road vehicles such as farm tractors or road-construction equipment with liquid, most often either water or, in colder climates, a solution of calcium chloride or ethylene glycol or propylene glycol and water. Such liquid acts as ballast for increasing traction and reducing tire wear. Finally, injected liquid solutions with small fibers in suspension have also been employed, however these are short term, heavy and quite messy to install.

Examples of prior art tires and/or tubes are as follows.

U.S. Pat. No. 4,471,827, which issued in 1984 for a "Non-pneumatic insert tube for tires" shows a non-pneumatic insert tube for a tire adapted to be mounted upon a circular rim. The insert tube is an elongated resilient plastic cylinder having a thin wall defining a continuous bore which extends throughout the entire tube length.

U.S. Pat. No. 5,795,414, which issued in 1998 for a "Puncture resistant tire assembly" shows a tire assembly for a pneumatic tire that gives a puncture resistant capability. The tire assembly includes an inner tube with an outer periphery having a plurality of protruding deflectable structures which are circumferentially continuous about the inner tube body.

U.S. Pat. No. 6,418,991, which issued in 2002 for a "Puncture proof inner tube", provides an improved pneumatic tube formed from a semi-rigid, air-tight rubber core encased by a plurality of thin, armoring Kevlar layers bonded to the exterior wall of the core.

US Published Application No. 2010/0084064, entitled "Puncture free tire tube, puncture free tire, and method for fitting tire tube to tire" shows a puncture free tire tube to be fitted under compressive deformation into a tube housing space of an annular tire outer wall, which is detachably fitted to an annular rim, the puncture free tire tube contains a long member extrusion-molded with an elastomer as a raw material, and has a cross sectional area of from 1 to 1.3 times a cross sectional area of the tube housing space of the tire outer wall and a length corresponding to a circumferential length at a center of the cross section of the tire outer wall.

Polymer foams, as a general class, are made up of a solid and a gas phase mixed together to form a foam. This generally happens by combining the two phases too fast for the systems to respond in a smooth fashion. The resulting foam has a polymer matrix with either air bubbles or air tunnels incorporated in it, which is known as either closed cell or open cell structure. Closed cell foams are generally more rigid while open cell foams are more flexible. The gas that is used in the foams is termed a blowing agent.

SUMMARY OF THE INVENTION

The present invention replaces any pneumatic inner tube in a wheel-tire assembly, with a multiple layer foam insert that can emulate and imitate the performance and weight of a pneumatic system through the manipulation of the ratios of the cross sections of the multiple foam layers. The insert eliminates problems of loss of air suffered by air filled inner tubes while preserving the performance and weight of the pneumatic tire and tube system that is used for bicycles, motorcycles, automobiles, trucks and other tire/tube pneumatic systems.

The materials of the foam insert contribute to its function, durability and weight. Through the use of modern materials such as extruded multicellular copolymers, the resilience, durability and energy return necessary to establish the feel and ride of a pneumatic tube can be realized. The use of these high energy copolymers in combination with light weight high strength extruded polystyrene in the core of the product can create a platform from which multiple sizes and multiple layer constructions can be made in any combination needed to address all types of uses, pressures and weights. This technique is a novel approach to the replacement of pneumatic structures in many possible areas of transportation.

DETAILED DESCRIPTION OF THE INVENTION

The foam tire insert of the invention can replace pneumatic tubes, especially in bicycles, although the insert can also be used in other applications where air-filled tubes or tires are used today. The insert is made through a foam construction technique using multiple layers of differing foam materials to yield a product that can emulate the feeling and performance of pressurized air in a tire and tube system, without significantly increasing the weight over an average thickness pneumatic tube. With such a construction technique with modern materials the need for pneumatic tubes can be eliminated for large classes of users.

The insert can made as a one piece annular component at its least expensive embodiment. Other embodiments can be arrived at by splitting the insert and mounting a clipping device at each end in order that the foam insert can be mounted without taking the wheel off of the bicycle. In addition, different quality level embodiments can be produced using different materials and different construction methods. This allows for different market segments by price and performance to be individually addressed.

Figure 1:
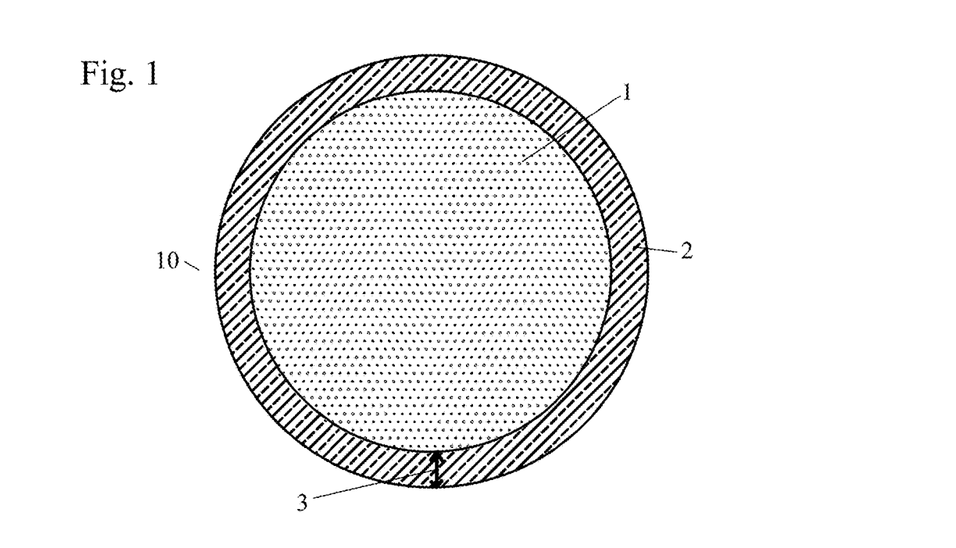
FIG. 1 shows a sectional view of a tire insert.
Figure 2:
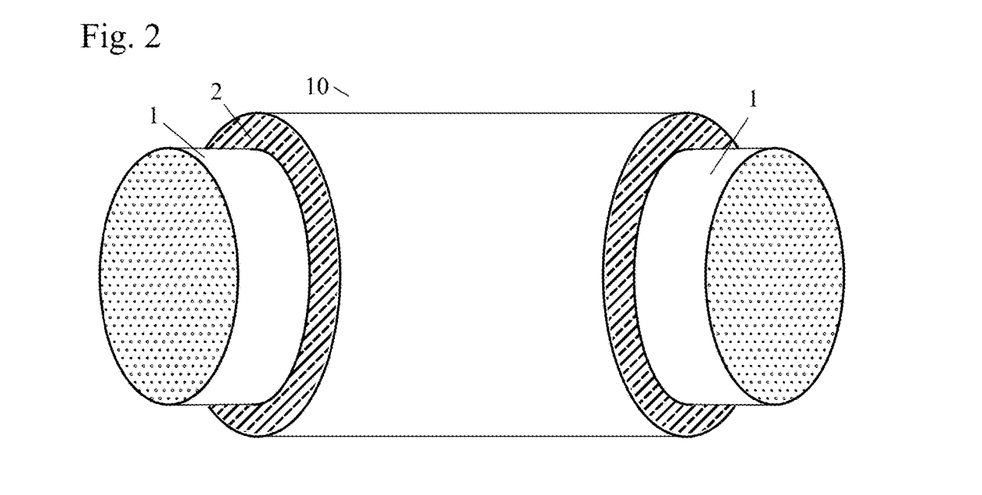
FIG. 2 shows a cut-away perspective view of an arcuate length of tire insert, with the outer layer cut away to show the inner layer.

FIGS. 1 and 2 show cross sectional views of a compound (multiple layer) foam tire insert 10 according to one embodiment of the invention, in which the insert 10 is formed of a combination of two distinct types of plastic foams known as polymer foams.

The core 1 of the insert 10 is formed of a stiff, structurally durable, lightweight foam material. The core 1 contributes to providing the long term structural integrity of the insert 10, and also provides the strength and mass that will provide the foundation for the outer layer 2 to rest upon. An appropriate material for the core 1 of the insert 10 would be light weight, non-compressible, flexible material that is in the class of closed cell cross-linked ethylene copolymer foams, closed cell cross-linked polyethylene foam (XLPE) or other commercially available cross linked polyethylene foams. These materials help the insert 10 emulate the structural air pressure that a pneumatic system provides.

The primary characteristics of this structure are light weight, less than 5% compressibility, less than 1% retained deformation under-load and after load relief, long term structural integrity, ease of handling and molding to high tolerances and low cost. The closed air cells in the structure help in emulating and providing the structural component of the system. The desired material characteristics of the material should allow the cell walls to be flexible enough to undergo some level of deformation while showing high retention of structural design after loading.

The outer layer 2 is formed of a different foam material from the material in the core 1, and is responsible for providing to the rider the feel and performance of a pneumatic tube system. The material of the outer layer 2 in this embodiment preferably has significant characteristics of energy return, wide temperature tolerance, shape retention, durability over time and the ability to be extruded in precision tolerances. Preferably, the material of the outer layer 2 has the property that it does not become rigid in a range of temperatures between −20 C and +40 C, and has the durability to last for three or more years.

An appropriate material for the outer layer 2 of the insert 10 would be a class of materials known as styrene-butadiene-styrene, or SBS. This substance is a hard rubber that's used for things like the soles of shoes, tire treads, and other places where durability is important. It's a type of copolymer called a block copolymer. Its backbone chain is made up of three segments: a long chain of polystyrene, a long chain of polybutadiene, and another long section of polystyrene.

SBS is also a type of unusual material called a thermoplastic elastomer (TPE). These are materials that behave like elastomeric rubbers at room temperature, but when heated, can be processed like plastics. Most types of rubber are difficult to process because they are crosslinked. But SBS and other thermoplastic elastomers manage to be rubbery without being crosslinked, making them easy to process into useful shapes.

The use of SBS as a component in the outer layer 2 of the insert 10 strongly assists the invention in emulating the resilience of the pneumatic structure. One specific type of SBS which is useful as an outer layer 2 in this embodiment is Olefin Block Copolymer (OBC), which are polyolefins with alternating blocks of hard (highly rigid) and soft (highly elastomeric) segments. The block structure of OBCs offers an advantaged performance balance of flexibility and heat resistance compared to random polyolefin copolymers. This material also has the distinct advantage of retaining stable performance characteristics over wide ranges of temperatures insuring correct function in a wide range of environmental conditions.

The outer layer 2 in this embodiment is applied evenly around the outside of the core 1 in a uniform thickness 3 which helps determine the performance characteristics of the product. By varying this dimension 3, the emulation by the insert 10 of pressure and performance of a pneumatic tire tube can be determined.

Figure 3:
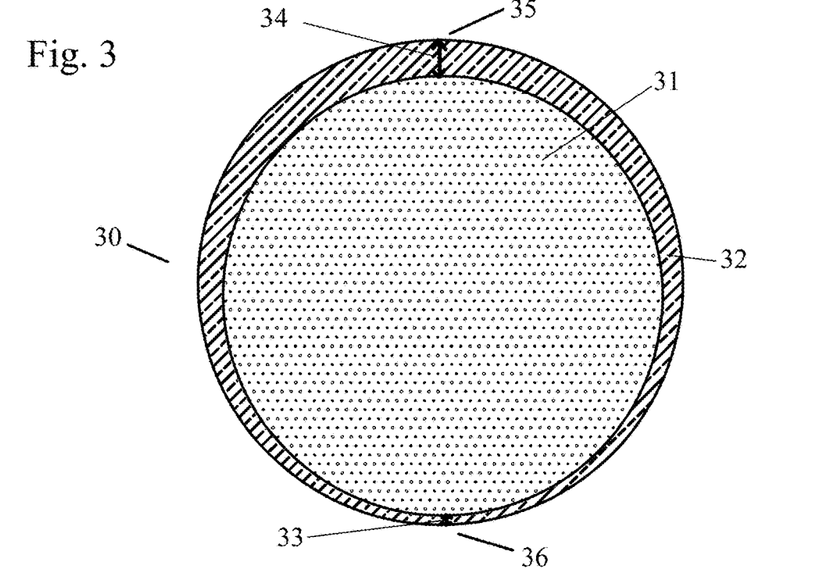
FIG. 3 shows a sectional view of second embodiment of a tire insert.
Figure 4:
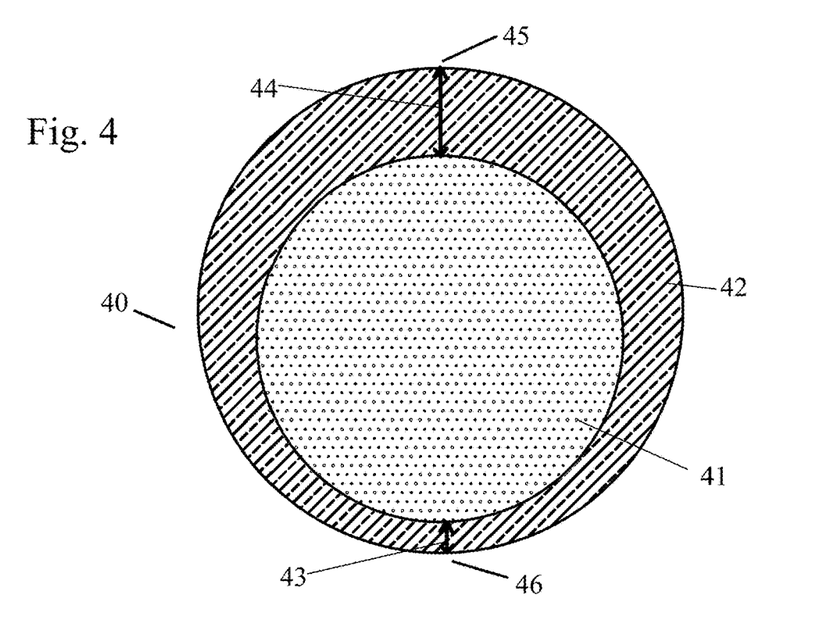
FIG. 4 shows a sectional view of a third embodiment of a tire insert.

FIGS. 3 and 4 show cross sectional views of another embodiment of the insert 10, in which the ratio of dimensions and location of the core and outer layer is varied to yield different performance characteristics.

FIG. 3 shows an alternative embodiment of the tire insert 30, which might be used to emulate the feeling of a high pressure, high performance tire of lighter weight. In this embodiment, the core 31 is larger relative to the outer layer 32, than the embodiment shown in FIGS. 1 and 2. The core 31 is offset toward the inner circumference 36 of the insert 30 so that the thickness 33 of the outer layer 32 nearest the inner circumference 36 is less than the thickness 34 of the outer layer 32 near the outer circumference 35 of the insert 30. This provides a high ratio of stiff, light core material 31 vs a lower ratio of high density highly flexible material in the outer layer 32.

FIG. 4 shows an alternative embodiment of the tire insert 40, which might be used to emulate a lower air pressure tire, giving the rider more comfort and forgiveness. In this embodiment, the core 41 is smaller relative to the outer layer 42, than the embodiment shown in FIGS. 1 and 2. As in the embodiment of FIG. 3, the core 41 is also offset toward the inner circumference 46 of the insert 40 so that the thickness 43 of the outer layer 42 nearest the inner circumference 46 is less than the thickness 44 of the outer layer 42 near the outer circumference 45 of the insert 40. This provides a lower ratio of stiff, light core material 41 vs a higher ratio of high density highly flexible material in the outer layer 42. This ratio of compounds will give a ride quality.

The ratio, form and material characteristics of these two materials combined into a tubular structure determine the characteristics of the tire insert of the invention. These two materials can be used in many ratios and in many forms in the tubular insert to emulate the desirable characteristics of a pneumatically inflated tube in such a way as to accurately imitate different types and pressures of tire and tube systems at weights that are competitive with pneumatic systems.

In order to emulate (imitate) the required pressures and performance of a pneumatic system in the multi-layer foam insert model three distinct factors must be considered.

The first factor is the diameter of the cavity into which the foam insert must be inserted. This diameter is the equivalent space that is filled by the pneumatically inflated tube. The accurate measurement of this diameter, at the desired inflated pressure is key to insuring the correct fit and function of the multilayer foam insert. Once this diameter is precisely measured and the pressure of the system defined then the design of the foam insert can begin.

The second factor is modeling the foam structure to achieve the desired weight and pressure emulation of the system. Every tire has a recommended pressure rating. The foam insert must be constructed in such a way that it emulates this required pressure. The core material of the foam insert structure is the determining element in achieving this desired pressure. This inner core material must also be formed from a material that has weight of below (at least) 20Kg per cubic meter of material. This weight parameter insures that the total structural weight will be acceptable to the consumer. This inner lightweight foam core "backbone" is key to the concept of a light weight high performance structure. Additionally, the core material must offer a kPa high enough to emulate the pressure of the inflated tube. The formula to convert kPa to PSI is 1:0.15. One kPa is equivalent to 0.15 PSI.

Table 1, below, illustrates the levels of kPa and their corresponding PSI. Once the defined Psi has been selected then the corresponding material with the correct kPa can be selected.

TABLE 1

| kPa | PSI |
|-----|-----|
| 1 | 0.15 |
| 100 | 14.50 |
| 200 | 29.01 |
| 300 | 43.51 |
| 400 | 58.02 |
| 500 | 72.52 |
| 600 | 87.02 |
| 700 | 101.53 |

The third factor to achieve the emulation of the required pressures and performance of a pneumatic system are the characteristics (dynamic and kPa) of the outer layer of the foam insert structure. This outer layer is critical to contributing to the foam structure a dynamic and functional aspect. Without this outer layer, the feel and function of the complete wheel system will be "dead" or "numb". The tire/wheel system will not perform properly and will not give the rider to the correct road surface performance/feedback. The thickness of this outer layer, in proportion, to the light weight inner foam core can be manipulated to achieve the desired final pressure and function of the system. Within the family of SBS (TPE) of thermoplastic elastomers there are many parameters of performance that can be defined. These material parameters can be manipulated in order to achieve the best performance for a given end user's purposes. The variations in thickness of the outer layer in combination with the almost limitless variations in material properties render the predictive modeling of structural performance problematic. In the end, physical prototyping with laboratory performance measurement will be the optimal method for determining the correct materials and ratios of circumferences of said materials to validate the correct structure of the product.

Figure 5:
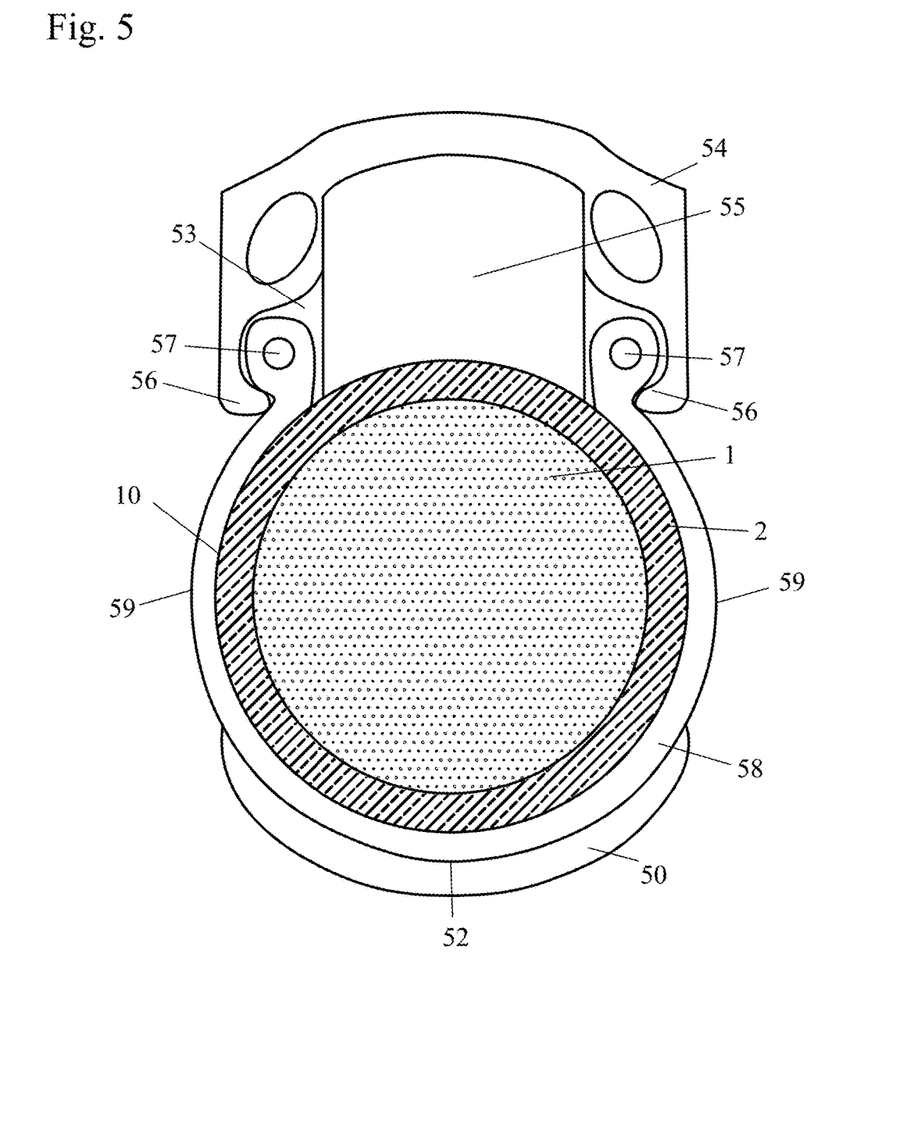
FIG. 5 shows a foam tire insert as mounted on a rim, within a tire.

FIG. 5 represents a sectional view of a bicycle wheel in which the foam insert 10 is mounted on a rim 54, within a tire 58. A foam pad 55 is placed around the rim 54 in the cavity 53 of the rim 54 to support the tire insert 10. The tire 58 has a sidewall 59, which is held within the edges 56 of the rim 54 by a bead 57, and has a tread 50 around an outer circumference 52 which is chemically and physically bonded to the tire 58 through the vulcanization process, as is conventional.

The formation of the structure of the insert 10 can occur, for example, in two ways.

The first method, shown in FIG. 6A-6F is through the use of an extrusion process that is well known and highly employed globally to extrude polyethylene foams.

Figure 6A:
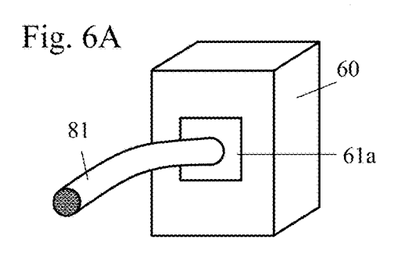
FIGS. 6A-6F shows a first method of forming a tire insert.

Step 1: FIG. 6A: By the use of a screw extrusion machine 60 with the correct dimension die 61a in place, the core 81 can be extruded.

Figure 6B:
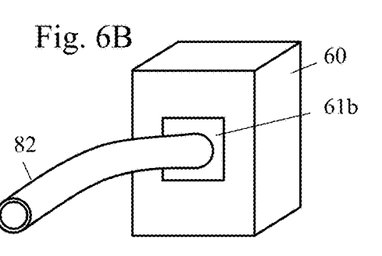

Step 2: FIG. 6B: By the use of a screw extrusion machine 60 with the correct dimension die 61b in place, the outer layer 82 can be extruded.

It should be noted that steps 1 and 2 could be performed in any order, and the lengths of core 81 and outer layer 82 can be made to length as needed, or long lengths can be made in advance in preparation for the succeeding steps described below, within the teachings of the invention.

Figure 6C:
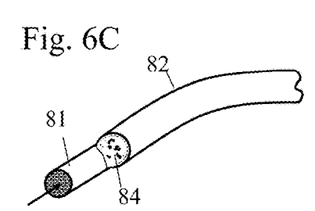

Step 3: FIG. 6C: The lighter weight, stiff core material 81 is inserted into the denser more flexible outer layer 82, forming the combined insert 80. Optionally, an adhesive 84 can be applied to the outside of the core 81 or the inside of outer layer 82, so as to provide adhesion between the core 81 and outer layer 82. An appropriate adhesive 84 for this process would be, for example, a low temperature spray-able hot melt adhesive that is hand sprayed on the product manually and then assembled into a final structure. An example of a non-toxic adhesive which could be used is Tec Bond 420 sprayable hot melt adhesive from Hotmelt.com. The extruded core 81 and outer layer 82, optionally connected by adhesive 84, will form the structure of the length of insert 80.

Figure 6D:
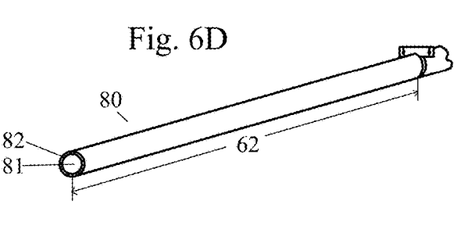

Step 4: FIG. 6D: If the insert 80 was formed from long lengths of core 81 and outer layer 82 material, as noted in step 2 above, the combined insert 80 is cut to the length 62 corresponding to the desired circumference of the finished tire insert 65. Alternatively, if the core 81 and outer layer 82 were formed to exact length 62 in steps 1 and 2 before being combined in step 3, this step can be omitted.

Figure 6E:
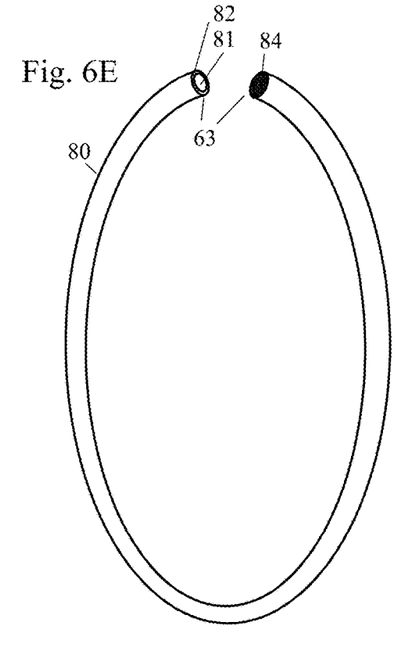

Step 5: FIG. 6E: Adhesive 64 is applied to both ends 63 of the insert 80. An appropriate adhesive 64 for this process would be, for example, a tape that is made with acrylic foam which is viscoelastic in nature. This gives the foam energy absorbing and stress relaxing properties which provides these tapes with their unique characteristics. The acrylic chemistry provides outstanding durability performance. These tapes utilize a variety of specific foam, adhesive, color and release liner types to provide each product/family with specific features. These features can include adhesion to specific or a broad range of materials, conformability, high tensile strength, high shear and peel adhesion, resistance to plasticizer migration, and UL746C recognition.

Figure 6F:
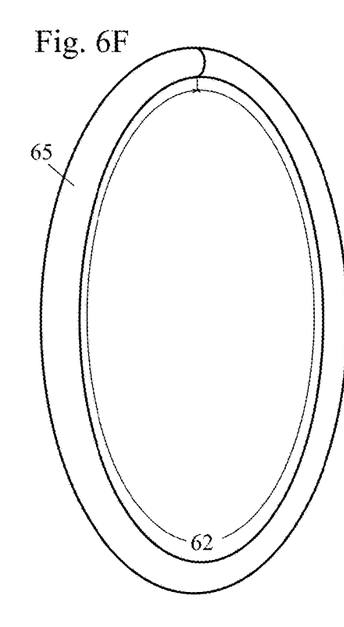

Step 6: FIG. 6F: The ends 63 of the insert 80 are joined, forming a completed tubular tire insert 65 that is ready for use in a tire system.

Figure 7A:
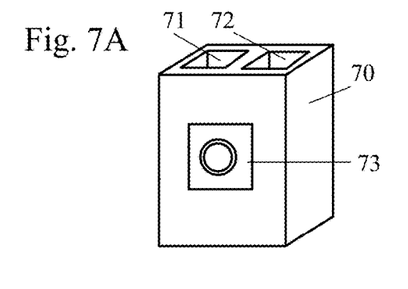
FIGS. 7A-7E show a second method of forming a tire insert.

The second method is uses a co-extrusion process using an extrusion machine 70 with compound die 73, which is less well known to extrude polyethylene foams. This method, shown in FIGS. 7A-7D comprises the following steps:

Step 1: FIG. 7A: Load the material for the core 81 and outer layer 82 into separate feed hoppers 71 and 72 in the extrusion machine 70, such that the two materials enter the extrusion machine 70 at the same time.

Figure 7B:
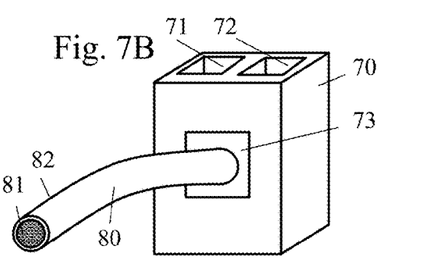

Step 2: FIG. 7B: Operate the extrusion machine 70 with the compound die 73 in place, thereby simultaneously extruding the inner core 81 and the outer layer 82 from the compound die 73 as a length of a complete tubular insert 80.

It should be noted that the insert 80 can be made to length as needed, or long lengths can be made in advance in preparation for the succeeding steps described below, within the teachings of the invention.

Figure 7C:
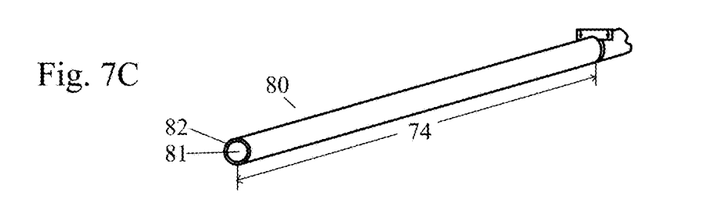

Step 3: FIG. 7C: If the insert 80 was formed as a long length of material, as noted in step 2 above, the insert 80 is cut to the length 74 corresponding to the desired circumference of the finished tire insert 78. Alternatively, if the insert 80 was formed to exact length 74 in step 2, this step can be omitted.

Figure 7D:
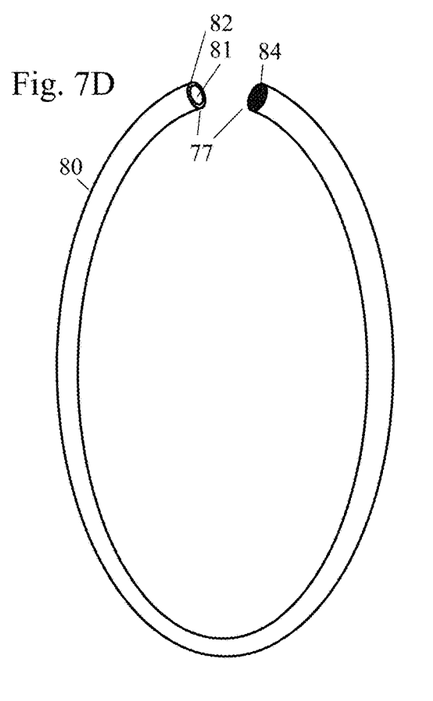

Step 4: FIG. 7D: Adhesive 76 is applied to both ends 77 of the insert 80. An appropriate adhesive 76 for this process would be, for example, a tape that is made with acrylic foam which is viscoelastic in nature. This gives the foam energy absorbing and stress relaxing properties which provides these tapes with their unique characteristics. The acrylic chemistry provides outstanding durability performance. These tapes utilize a variety of specific foam, adhesive, color and release liner types to provide each product/family with specific features. These features can include adhesion to specific or a broad range of materials, conformability, high tensile strength, high shear and peel adhesion, resistance to plasticizer migration, and UL746C recognition.

Figure 7E:
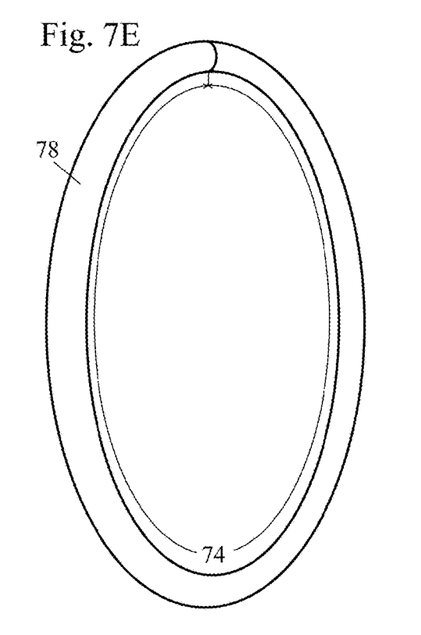

Step 5: FIG. 7E: The ends 77 of the insert 80 are joined, forming a completed tubular tire insert 78 that is ready for use in a tire system.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A wheel for a vehicle comprising:
    a) a rim having an inner circumference, and an outer circumference and a cavity therebetween;
    b) a tire mounted around the outer circumference of the rim; and
    c) an insert inside the tire, comprising:
        (i) a stiff core composed of a first foam material;
        (ii) a resilient outer layer that substantially encircles a peripheral surface of the core and composed of a second foam material different from the first foam material
        (iii) a foam material configured to fill the cavity of the rim.

2. The wheel of claim 1, in which the first foam material of the core is closed-cell foam.

3. The wheel of claim 1, in which the first foam material of the core is cross-linked ethylene copolymer foam.

4. The wheel of claim 1, in which the first foam material of the core is closed cell cross-linked polyethylene foam.

5. The wheel of claim 1, in which the second foam material of the outer layer is a thermoplastic elastomer.

6. The wheel of claim 5, in which the second foam material of the outer layer is styrene- butadiene-styrene block copolymer.

7. The wheel of claim 1, further comprising an adhesive bonding the core to the outer layer.

8. The wheel of claim 1, in which a center of the core is eccentric relative to the outer layer of the outer layer between an outer circumference of the core and an outer circumference of the insert is greater than a thickness of the outer layer between an inner circumference of the core and the inner circumference of the tire insert.

9. The wheel of claim 1 wherein the rim defines a rotational axis and wherein the outer layer encircles the core in at least one cross-sectional plane containing a radial projecting from the rotational axis.

10. The wheel of claim 9 wherein the outer layer comprises at least two elements which are joined during assembly of the insert such that the outer portion completely encircles the inner core along the at least one cross-sectional plane.

11. The wheel of claim 1 wherein the insert includes at least one interlocking interface disposed about a circumference of the insert.

* * * * *